A. B. RECK.
HEATING WATER FOR CIRCULATING SYSTEMS.
APPLICATION FILED APR. 14, 1908.

1,101,330.

Patented June 23, 1914.
3 SHEETS—SHEET 1.

WITNESSES

INVENTOR
Anders Borch Reck

Figure 2:
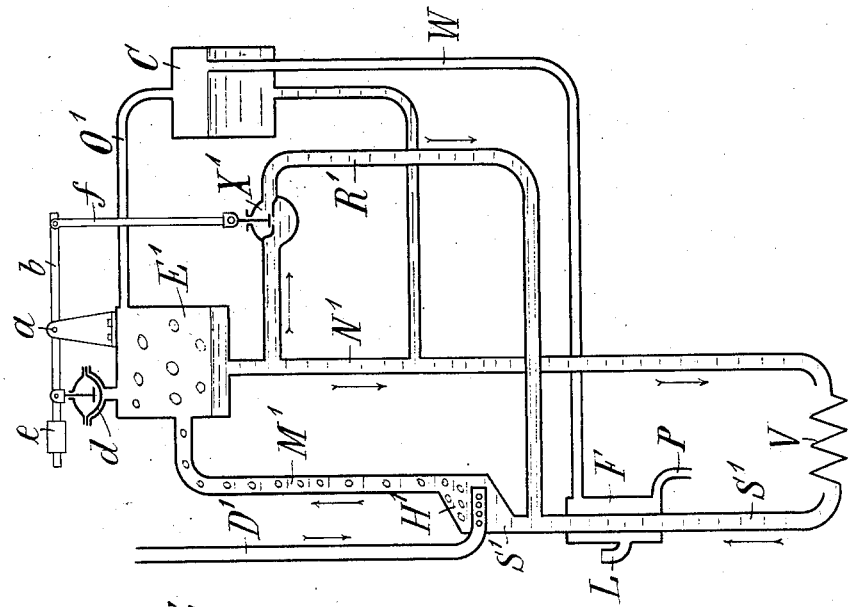

A. B. RECK.
HEATING WATER FOR CIRCULATING SYSTEMS.
APPLICATION FILED APR. 14, 1908.
1,101,330.
Patented June 23, 1914.
3 SHEETS—SHEET 2.
FIG. 2.ᵃ
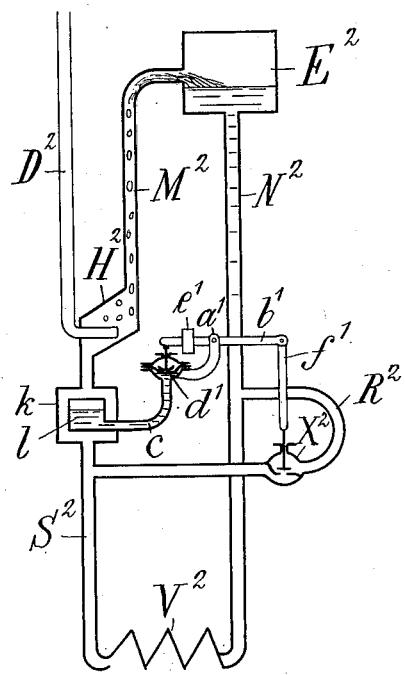
WITNESSES
W. P. Burke
Edw. D. Spring
INVENTOR
Anders Borch Reck
ATTY.

A. B. RECK.
HEATING WATER FOR CIRCULATING SYSTEMS.
APPLICATION FILED APR. 14, 1908.
1,101,330.
Patented June 23, 1914.
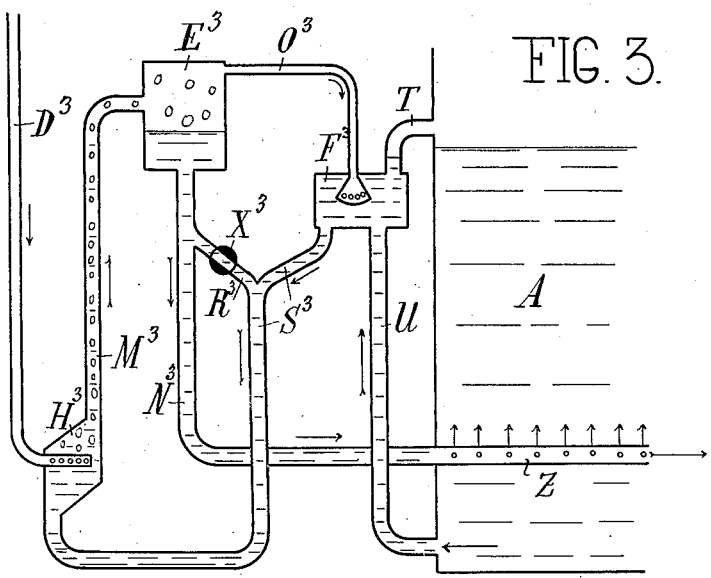
FIG. 3.
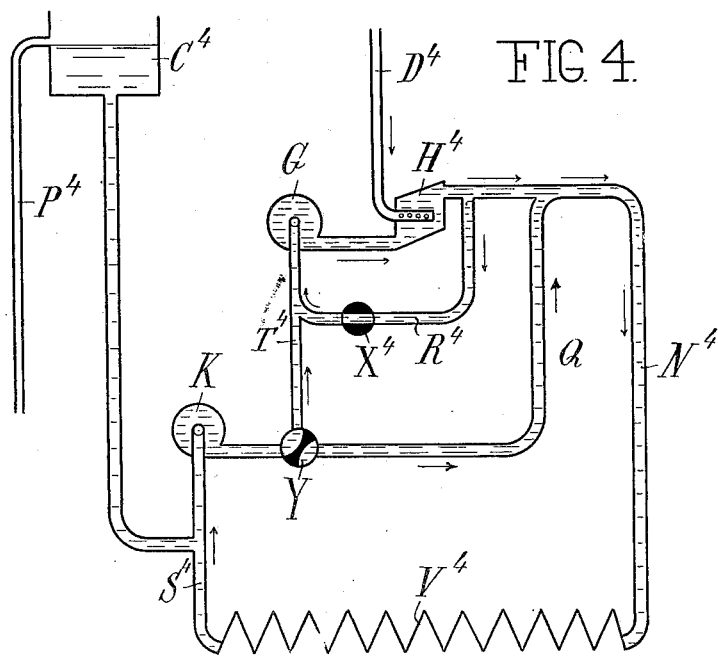
FIG. 4.
WITNESSES
W. P. Burke
Edw. D. Spring.
INVENTOR
Anders Borch Reck
ATTY.

UNITED STATES PATENT OFFICE.

ANDERS BORCH RECK, OF HELLERUP, DENMARK.

HEATING WATER FOR CIRCULATING SYSTEMS.

1,101,330.  Specification of Letters Patent.  Patented June 23, 1914.

Application filed April 14, 1908. Serial No. 426,972.

*To all whom it may concern:*

Be it known that I, ANDERS BORCH RECK, a subject of Denmark, residing at Christiansvej 16, Hellerup, in the Kingdom of Denmark, have invented new and useful Improvements in and Relating to the Heating of Water for Circulating Systems, of which the following is a specification.

The object of the present invention is to obtain both cheaply and simply the noiseless operation of steam-water heaters of the kind in which steam is introduced directly into the water.

As is generally known an absolutely noiseless operation is only obtained in such apparatus if the water is heated to a fairly high temperature before the steam is introduced into it and for this purpose a preheater has up to the present generally been used, as for instance pipes, through which the water has to pass before the steam is introduced into it, surrounded by a steam space, so that the heat of the steam through the walls of the pipes can be led to the water. Such surface-preheaters are however expensive and require also frequent cleaning and repairing.

The present invention applies to an arrangement by which the said pre-heaters can be omitted though the water is heated before the steam is introduced into it.

Figure 1:
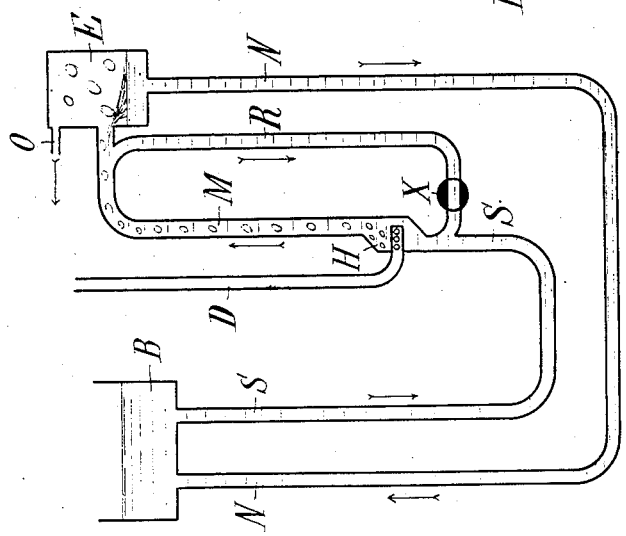

Figure 1 shows the invention in its most simple form used for the heating of the water in a tank. Fig. 2 shows the arrangement of heating the water circulating in a hot water heating apparatus. Fig. 2$^a$ shows a modification of the arrangement in Fig. 2. Fig. 3 shows an arrangement of the said invention, especially adapted for the heating of a large hot water tank, a swimming reservoir or the like. The said four figures show diagrammatically forms of the invention where it is unnecessary to have mechanical motive power. Fig. 4 shows a form of the invention wherein mechanical motive power is used as motive power for a centrifugal pump.

Fig. 1 shows a water heater H through which the water has to pass when the apparatus is in operation. This water comes from the open tank B through the pipe S. The water will, from the water heater H, find its way back to the tank B through the pipe M, the separating chamber E and the pipe N.

A steam pipe D, coming from a steam boiler, discharges into the water heater H. This pipe is shown in the figure to project into the water heater H and having lateral outlet holes through which the steam can pass direct into the water passing through the said heater. The circulation of the water through the pipes S, M, N, and the tanks connected to these pipes is obtained in the known manner if enough steam is introduced into the water heater H in order to heat the water in the heater to such a high temperature that the pipe M (the motor pipe) rising from the heater can be filled by a mixture of about half water and half steam. This steam is separated from the water in the separating chamber E and escapes through the pipe O. The water in the pipe N—not containing any steam—will then have about double the specific gravity of the mixture in the pipe M, and it is this difference in the specific gravity which produces the circulation of the water.

The present invention consists now in adding a pipe R to the said pipes and tanks, forming a by-pass connected at one end to the upper end of the motor pipe M, whereby the circulation of the water is effected as described above and at its other end to the return pipe S where this pipe enters the water heater H, so that some of the water heated by the steam will be drawn back through the said pipe R to the suction side and here mixed with the colder water passing to the heater, so that the mixture will have a sufficiently high temperature to avoid noise during the introduction of the steam into the water when it passes the water heater H.

Fig. 1 shows a valve X situated on the by-pass pipe R. This valve X is perhaps not necessary for the working of the apparatus, but it will as a rule be advisable to have it, as it enables the quantity of the water that passes through the by-pass pipe R to be regulated, so that more water will not pass through this pipe than is necessary to have a noiseless operation of the heater.

Fig. 2 is a modification of the apparatus shown in Fig. 1 whereby the aforesaid valve on the by-pass pipe is shut automatically when the water, passing through the pipe S$^1$ to the water heater H$^1$, is so hot that the introduction of steam in the water is effected without any noise, even if the by-pass pipe $R^1$ is kept shut. This modification is especially adapted for steam water heaters of the type shown in Fig. 1 when these heaters are used to heat the water in hot-water heating apparatus. Fig. 2 shows in section such a heating apparatus, in which the piping and heating radiators of the heating apparatus are assumed to be fixed at V. The tank C is the expansion tank of the heating apparatus. The steam separated from the water in the separating chamber $E^1$ goes through the pipe $O^1$ to the expansion tank C and further through the overflow pipe W of this tank to the surface condenser F where it is condensed in touching the pipe $S^1$, through which the water flows, which has been cooled in the pipes and radiators V of the heating apparatus. In addition to the steam from the pipe $O^1$ the pipe W is traversed also by the overflow water from the expansion tank C which would otherwise fill on account of the increase of the quantity of water through condensation of steam from the steam pipe $D^1$ in the water heater $H^1$. In the surface condenser F an automatic air valve indicated by L is open as long as there is air in the condenser, but shuts itself when the air is driven out by the steam passing through the pipe W. The water, collected in the condenser F, may be led back to the steam boiler through the pipe P so that there is a constant water level in this boiler.

The steam in the separating chamber presses from below against a movable india-rubber membrane $d$. This pressure is transferred to a lever $b$ loaded by a weight $e$ and fulcrumed at $a$, which is connected by a link $f$ with the valve $X^1$ in the by-pass pipe $R^1$, which valve is closed automatically when the pressure in the tank $E^1$ exceeds a definite value. As long as the water which passes through the pipes and radiators V of the heating apparatus is cold, so much of the steam passing through the pipe $D^1$ is condensed in the water heater $H^1$ that only little steam will separate from the water flowing through the pipe $M^1$ into the separating chamber $E^1$ and the pressure in this tank will not be sufficient to lift the membrane $d$ and the weight $e$. The valve $X^1$ will under these circumstances remain open and heated water will pass through the pipe $R^1$ to the pipe $S^1$ and here mix with the cold water rising through this pipe so that the mixture gets warm enough to cause a noiseless introduction of the steam into the water in the water heater $H^1$. As the water, coming from the heating apparatus through the pipe $S^1$, gets hotter more steam will separate in the separating chamber $E^1$, resulting in an increase of pressure which in time becomes sufficient to lift the membrane $d$ and the weight $e$ and close the valve $X^1$ so that all the water, coming from the pipe $M^1$, passes out through the pipe $N^1$ and the pipes and radiators V of the heating apparatus.

Another method of automatically moving the valve $X^1$ is shown in Fig. 2ª and consists in placing a temperature regulator of any suitable known kind on the supply pipe leading to the water heater $H^2$; this regulator is arranged to close the valve $X^2$ when the temperature of the water in the supply pipe $S^2$ reaches the point where heater $H^2$ can operate noiselessly, but again opens the valve, as soon as the temperature of the water becomes lower than the said temperature.

In Fig. 2ª there is shown the application of a type of regulator in which a receiver $l$ is placed within an enlargement $k$ on this supply pipe $S^2$ through which water passes to the heater $H^2$. The receiver $l$ is filled with a fluid, which boils at the temperature the water must have to insure the introduction of steam into the heater without noise. The pressure in the receiver $l$ is transmitted through the pipe $c$ to a membrane $d^1$ which with increased pressure lifts one end of a lever $b^1$ which is loaded suitably as by weight $e^1$, and is fulcrumed at the point $a^1$. The other end of the lever $b^1$ is connected with the valve $X^2$ as by a link or bar such as $f^1$ in such a manner that the valve closes when the pressure in the receiver $l$ rises and lifts the membrane $d^1$, but again opens under the action of the weight $e^1$ when the pressure falls.

Fig. 3 is a modification of the apparatus shown in Fig. 1 especially adapted to be used in cases where the steam water heater heats the water in hot water tanks, a swimming reservoir, a bucking-tub or the like. A is the water tank in which the water has to be heated. The combination of the water heater $H^3$ and the vertical motor pipe $M^3$ sucks up the water from the tank through the pipe U and sends it back again when it has been heated through the pipes $N^3$ and Z. The pipe U discharges into the condenser $F^3$ which is a tank connected by an open pipe T with the tank A above the water level of this tank. The steam pipe $O^3$ from the separating chamber $E^3$ discharges into the water space of the condenser $F^3$ through a rose and the pipe $S^3$ connects the condenser to the water heater $H^3$ in such a manner that the cold water coming from the tank A through the pipe U on its way through the condenser $F^3$ can condense the steam coming from the separating chamber through the pipe $O^3$. The by-pass pipe $R^3$ between the pipe $N^3$ and the suction side of the heater $H^3$ is provided with a regulating valve $X^3$, and is connected to the pipe $S^3$, so that some of the heated water, coming from the separating chamber $E^3$ will pass through the by-pass pipe $R^3$ to the pipe $S^3$ instead of passing to the tank A. The said heated water will here heat the cold water coming from the pipe U and the condenser F³ so much that the introduction of the steam in the water in the water heater H³ can be effected without any noise.

In the arrangements hereinbefore described the circulation of the water is effected solely by means of the water heater and the motor pipe but the water heater may also be combined with any other means of propelling or circulating the water.

As shown in Fig. 4 one or more pumps may be used as means of propulsion. The centrifugal pump K operates principally to effect the circulation through the heating apparatus V⁴ and as shown has the special advantage that, by adjusting the three way cock Y as much of the water passes through the pipe Q and as little water through the pipe T⁴ as may be desired so that the water may be expelled through the pipe N⁴ with just as low a temperature as may be desired, while the centrifugal pump G and the heater H⁴ may work with water having a temperature near its boiling point.

In all cases not only the heater H⁴ in which the steam is introduced into the water but also the pump G that produces the local circulation of heated water from the delivery side to the suction side of the heater must be placed between the two points on the piping to which the by-pass pipe R⁴ is connected.

Having now described my invention, what I claim as new and desire to secure by Letters Patent is:

1. A hot water heating system comprising a steam water heater of that kind that is adapted for heating water by low pressure steam by being provided with a partition with a number of perforations for the passage of steam from a steam space to a water space, a steam supply pipe delivering steam into the steam space of said water heater, a system of water filled pipes and heat transmitting surfaces or radiators, a water filled flow main connected at one end to the said water heater and at the other end to said system of water filled pipes and heat transmitting surfaces or radiators, a water filled return main connected at one end to the said system of pipes and heat transmitting surfaces and at its other end to the said water heater, said system including means for establishing a circulation of water therethrough, said means to be inserted in the circuit adjacent to the said water heater and a by-pass pipe connected at one end to the water-filled flow part of the hot water system at a point adjacent to the part of the circuit that is comprised of the said water heater and the said means and at its other end to the return part of the hot water system at a point adjacent to the part of the circuit that is comprised of the said water heater and the said means, said by-pass being adapted to divert a portion of the flowing water and intermingle it with the return water, said portion of the flowing water passing directly from the flow side of the said water heater to the suction side instead of making the entire circuit through the hot water heating system.

2. A hot water heating system comprising a steam water heater of that kind that is adapted for heating water by low pressure steam by being provided with a partition with a number of perforations for the passage of the steam from a steam space to a water space, a steam supply pipe delivering steam into the steam space of said water heater, a pipe rising from a lower to a higher level, a closed steam separating chamber, said rising pipe being connected at its lower end to the said water heater and delivering at its upper end into said closed steam separating chamber, a water filled flow main connected at one end to the lower part of the said separating chamber and at its other end to a system of water filled pipes and heat transmitting surfaces or radiators, a water filled return main connected at one end to the said system of pipes and heat transmitting surfaces and at the other end to the said water heater, a condenser inserted in the said return main, a steam releasing pipe connecting the upper part of the said steam separating chamber with the said condenser and a by-pass pipe connected at one end with the said water filled flow main at a point adjacent to said separating chamber and at its other end with the said return main at a point adjacent to said water heater, said by-pass pipe being adapted to divert a portion of the flowing water and intermingle it with the return water, said portion of the flowing water passing directly from the flow side of the said heater and the said rising pipe to the suction side instead of making the entire circuit through the said heat transmitting surfaces.

3. A hot water heating system comprising a steam water heater of that kind that is adapted for heating water by low pressure steam by being provided with a partition with a number of perforations for the passage of the steam from a steam space to a water space, a steam supply pipe delivering steam into the steam space of said water heater, a pipe rising from a lower to a higher level, a closed steam separating chamber, said rising pipe being connected at its lower end to the said water heater and delivering at its upper end into said closed steam separating chamber, a system of water filled pipes and heat transmitting surfaces or radiators, a water filled flow main connected at one end to the lower part of the said separating chamber and at its other end to said system of water filled pipes and heat transmitting surfaces or radiators, a water filled return main connected at one end to the said system of pipes and heat transmitting surfaces and at the other end to the said water heater, a condenser inserted in the said return main, a steam releasing pipe connecting the upper part of the said steam separating chamber with the said condenser, a by-pass pipe connected at one end with the said water filled flow main at a point adjacent to said separating chamber and at its other end with the said return main at a point adjacent to said water heater, said by-pass pipe being adapted to divert a portion of the flowing water and intermingle it with the return water, said portion of the flowing water passing directly from the flow side of the said heater and the said rising pipe to the suction side instead of making the entire circuit through the said heat transmitting surfaces, a regulating valve inserted on said by-pass pipe and means for closing said regulating valve when the steam pressure in the said steam separating chamber increases over a certain limit, and opening it again when the said pressure decreases below said limit.

In testimony whereof I have signed my name to this specification in the presence of two subscribing witnesses.

ANDERS BORCH RECK.

Witnesses:
N. M. CULLEN,
OSKAR NIELSEN.